United States Patent
Kida et al.

(10) Patent No.: US 7,835,614 B2
(45) Date of Patent: Nov. 16, 2010

(54) DATA RECORDING METHOD, DATA RECORDING APPARATUS, AND DATA RECORDING MEDIUM

(75) Inventors: Ayumi Kida, Chiba (JP); Jiro Kiyama, Chiba (JP); Takayoshi Yamaguchi, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1379 days.

(21) Appl. No.: 10/559,695

(22) PCT Filed: May 21, 2004

(86) PCT No.: PCT/JP2004/006970

§ 371 (c)(1),
(2), (4) Date: Dec. 6, 2005

(87) PCT Pub. No.: WO2004/109697

PCT Pub. Date: Dec. 16, 2004

(65) Prior Publication Data
US 2006/0120687 A1 Jun. 8, 2006

(30) Foreign Application Priority Data
Jun. 6, 2003 (JP) ................ 2003-162928

(51) Int. Cl.
*H04N 5/91* (2006.01)
*H04N 7/00* (2006.01)
(52) U.S. Cl. .................. 386/46; 386/95; 386/125
(58) Field of Classification Search .......... 386/46, 386/125, 95
See application file for complete search history.

(56) References Cited

FOREIGN PATENT DOCUMENTS

| EP | 1206135 A1 | * | 5/2002 |
|---|---|---|---|
| JP | 11-134233 | | 5/1999 |
| JP | 2002-175680 | | 6/2002 |
| JP | 2002-373480 | | 12/2002 |
| JP | 2002373480 A | * | 12/2002 |
| JP | 2003-169292 | | 6/2003 |
| JP | 2004-120099 | | 4/2004 |
| WO | WO-99/40586 | | 8/1999 |

* cited by examiner

*Primary Examiner*—Thai Tran
*Assistant Examiner*—Girumsew Wendmagegn
(74) *Attorney, Agent, or Firm*—David G. Conlin; Steven M. Jensen; Edwards Angell Palmer & Dodge LLP

(57) ABSTRACT

To produce a user program externally referring to an original program and to record postrecording data to the user program, ref_counter that indicates how many times the postrecording data is referred to from a user program of the postrecording data is set (S1505). The ref_counter having been set is recorded onto an optical disc, along with the user program thus produced (S1507).

6 Claims, 25 Drawing Sheets

FIG. 4

```
Movie atom {
        Atom size
        Type('moov')
        Movie header atom
        Track atom (video track)
        Track atom (main audio track)

User data atom
}
```

FIG. 5

```
Track atom {
        Atom size
        Type('trak')
        Track header  atom
        Edit atom
        Track reference atom
        Media atom
        User data atom
                :
}
```

FIG. 6

```
Track header atom {
        Atom size
        Type('tkhd')
        Version
        Flags
        Creation time
        Modification time
        Track ID
        Reserved
        Duration
        Reserved
        Layer
        Alternate group
        Volume
        Reserved
        Matrix structure
        Track width
        Track height
}
```

FIG. 7

```
Media atom {
        Atom size
        Type('mdia')
        Media header  atom
        Handler reference atom
        Media information atom
        User data atom
}
```

FIG. 8

```
Media information atom {
    Atom size
    Type(='minf')
    {Video or Sound or Base} media information header atom
    Handler reference atom
    Data information atom
    Sample table atom
}
```

FIG. 10

```
Sample table atom {
        Atom size
        Type(='stbl')
        Sample description atom
        Time-to-sample atom
        Sync sample atom
        Sample-to-chunk atom
        Sample size atom
        Chunk offset atom
}
```

FIG. 11 (a)

```
Sample description atom {
    Atom size
    Type(='stsd')
    version
    flags
    number-of-entries
    for(i=0; i<number-of-entries; ++){
        Sample Description Table
    }
}
```

FIG. 11 (b)

```
Sound Sample description Table {
    size
    data-format
    reserved
    data-reference-index
    //sample description fields for sound media//
    version
    ..
}
```

FIG. 12

```
Edit atom {
        Atom size
        Type(='edts')
        Edit list atom
}

Edit list atom {
        Atom size
        Type(='elst')
        Versions
        Flags
        Number of entries(=N)
        for (i = 0; i < N; i++){
                Track duration
                Media time
                Media rate
        }
}
```

FIG. 14

```
User data atom {
        Atom size
        Type(='udta')
        for (i=0;i<N; i++){
                Atom size
                Type
                User data
        }
}
```

FIG. 17

```
User data atom {
        Atom size
        Type(='udta')
        for (i=0;i<N; i++){
                Atom size
                Type('rfmg':reference management)
                ref_counter
        }
}
```

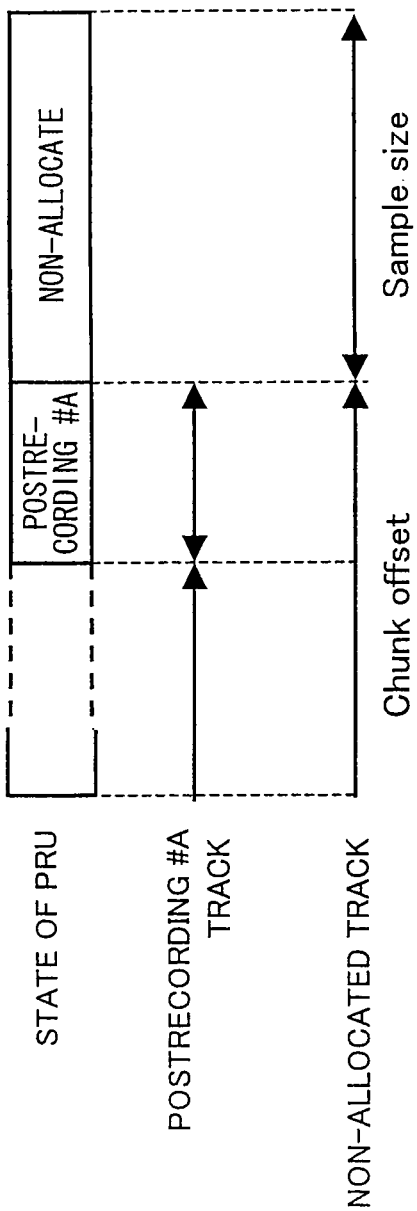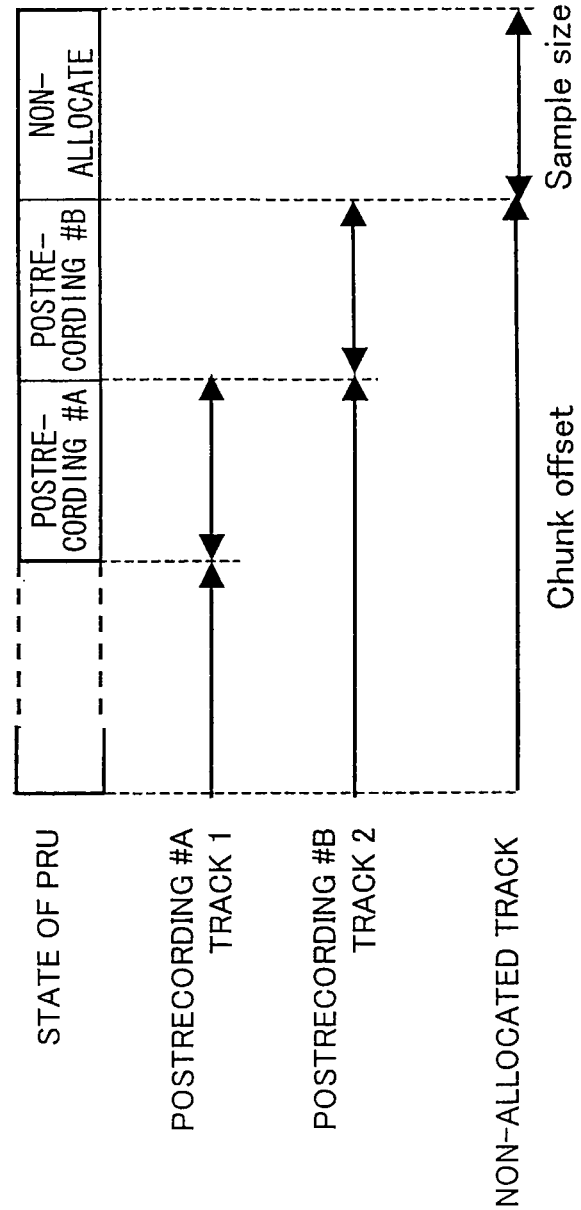
FIG. 19 (a) BEFORE ADDITION OF POSTRECORDING DATA
FIG. 19 (b) AFTER ADDITION OF POSTRECORDING DATA

DATA RECORDING METHOD, DATA RECORDING APPARATUS, AND DATA RECORDING MEDIUM

TECHNICAL FIELD

The present invention relates to a data recording method and a data recording apparatus for recording or playing back video data and audio data onto or from a random-access recording medium such as a hard disk and optical disc.

BACKGROUND ART

Digital video/audio recording/playback apparatuses adopting disc mediums and/or semiconductor mediums have become popular. In this relation, there have been needs for inexpensively adding postrecording capability to the digital video/audio recording/playback apparatuses adopting disc mediums, as in the case of apparatuses adopting tape mediums. The postrecording capability allows for the addition of information (audio and graphic information in particular) to audio and/or video data that have been recorded.

Being different from the tape mediums, the disc mediums characteristically allow for nondestructive editing, i.e. nonlinear editing. That is, the nondestructive editing capability or nonlinear editing capability allows any sections of an AV stream recorded on a disc to be played back in an optional order, without moving or copying the AV stream. Not just changing the order of playback, the aforesaid capability makes it possible to produce different kinds of user programs from a single set of scenes, i.e. makes it possible to share a single set of scenes between a plurality of user programs. In response to this, the users' demand to perform postrecording corresponding to each user program.

For example, it has been demanded to add, in a program A, background music to a particular scene, meanwhile, in a program B, to add narration to the same scene. To meet such a demand, Japanese Laid-Open Patent Application No. 2002-373480 (published on Dec. 26, 2002) proposes to provide information for managing postrecording area allocation. With this, in a case where a plurality of user programs carry out the postrecording, it is possible to avoid unintentional overwriting to a scene shared between the different user programs.

FIG. 27 shows a recording format of a disc disclosed in Japanese Laid-Open Patent Application No. 2002-373480. A recording area on the disc is composed of a series of ECC (Error Correcting Code) blocks. The ECC block is the smallest unit for encoding. Parity for error correction is added to data, so that the encoding is performed. To read data from the disk, the reading error correction is carried out in units of the ECC blocks, and then required data is obtained.

On the other hand, to rewrite data on the disc, the data is read out in units of the ECC blocks, a necessary part of the error-corrected data is rewritten, an error code is added again, and the data is recorded onto the disc.

In the ECC block, video data and audio data are arranged in the following order: postrecording data block, original audio block, and original video block. Each of these blocks includes postrecording data, original audio data, and original video data, which correspond to a more or less identical period of time.

It is noted that the original audio block and original video block are termed "original block". To allow the recording of an original program (video picture before the recording of postrecording data), dummy data has been recorded in the postrecording data block.

The recording of postrecording data involves data writing to the postrecording data block. In this relation, an area, of the postrecording data block, to which the recording has been done is regarded as an allocated area, while the remaining areas of the postrecording data block are regarded as non-allocated areas. Management information in the original program individually manages these types of areas. Referring to the management information, it is possible to prevent postrecording data from being overwritten when different user programs are used. In a case where new postrecording data is recorded, management information of each area is rewritten.

However, in the above-described arrangement, in a case where a user program is deleted, it is difficult to delete unnecessary postrecording data corresponding to the user program to be deleted, and to effectively reutilize the freed postrecording data block area. This is because of the reason below.

In a case where a scene is shared between a plurality of user programs, it is not easy to delete each piece of postrecording data, because each piece of data may be referred to by the plurality of user programs.

That is to say, when deleting a user program and also postrecording data referred to by the user program, the postrecording data must be only referred to by that user program to be deleted, i.e. the data is required not to be shared by another user program.

In the conventional art, after the deletion of a user program, it is necessary to check the management information of all user program, to determine that postrecording data which was referred to by the deleted program is not referred to by any other user programs and hence the data can be deleted. The checking of the management information causes trouble in terms of processing time, particularly in a case of optical discs that requires long seek time.

DISCLOSURE OF INVENTION

The present invention was done to solve the above-described problem, and the objective of the present invention is to provide a data recording method and data recording apparatus, which make it easy to determine, at the time of deleting a user program, whether or not postrecording data which is referred to from the user program can be deleted.

To achieve the objective above, the data recording method of the present invention for recording, onto a recording medium, AV data and postrecording data in synchronization with the AV data, is characterized in that, on the recording medium, a plurality of user programs using an identical scene in the AV data being producible, and the postrecording data being referable from a plurality of user programs, the data recording method comprising the step of recording, onto the recording medium, management information that manages a relationship between a user program and postrecording data.

According to the arrangement above, to record AV data and postrecording data in synchronization with the AV data onto a recording medium, a plurality of user programs using an identical scene in the AV data can be produced on the recording medium, and the postrecording data can be referred to from a plurality of user programs, on the recording medium.

For example, in a case where a user program is deleted and postrecording data referred to from the user program to be deleted is also deleted, it is necessary to confirm that the postrecording data which is the target of the deletion is referred to only from the user program to be deleted. According to the arrangement above, it is possible to easily perform the confirmation above in reference to the management information.

Additional objects, features, and strengths of the present invention will be made clear by the description below. Further, the advantages of the present invention will be evident from the following explanation in reference to the drawings.

BRIEF DESCRIPTION OF DRAWINGS

FIG. 4 shows the outline of a Movie atom in the QuickTime file format.

FIG. 5 shows the outline of a Track atom in the QuickTime file format.

FIG. 6 shows a Track header atom in the QuickTime file format.

FIG. 7 shows a Media atom in the QuickTime file format.

FIG. 8 shows a Media information atom in the QuickTime file format.

FIG. 10 shows a Sample table atom in the QuickTime file format.

FIG. 11(a) shows a Sample description atom in the QuickTime file format, and FIG. 11(b) shows a Sound Sample description Table.

FIG. 12 shows an Edit atom in the QuickTime file format.

FIG. 14 shows a User data atom in the QuickTime file format.

FIG. 17 shows a User data atom in the QuickTime file format in First Example of the present invention.

FIGS. 19(a) and 19(b) show the change in a non-allocated track at the time of generating a user program, in Embodiment 1 of the present invention.

BEST MODE FOR CARRYING OUT THE INVENTION

The following will describe embodiments of the present invention in detail, in reference to figures. In the following, arrangements commonly used in the present invention are described first, and then characteristics unique to the respective embodiments are discussed.

<System Configuration>

Figure 2:
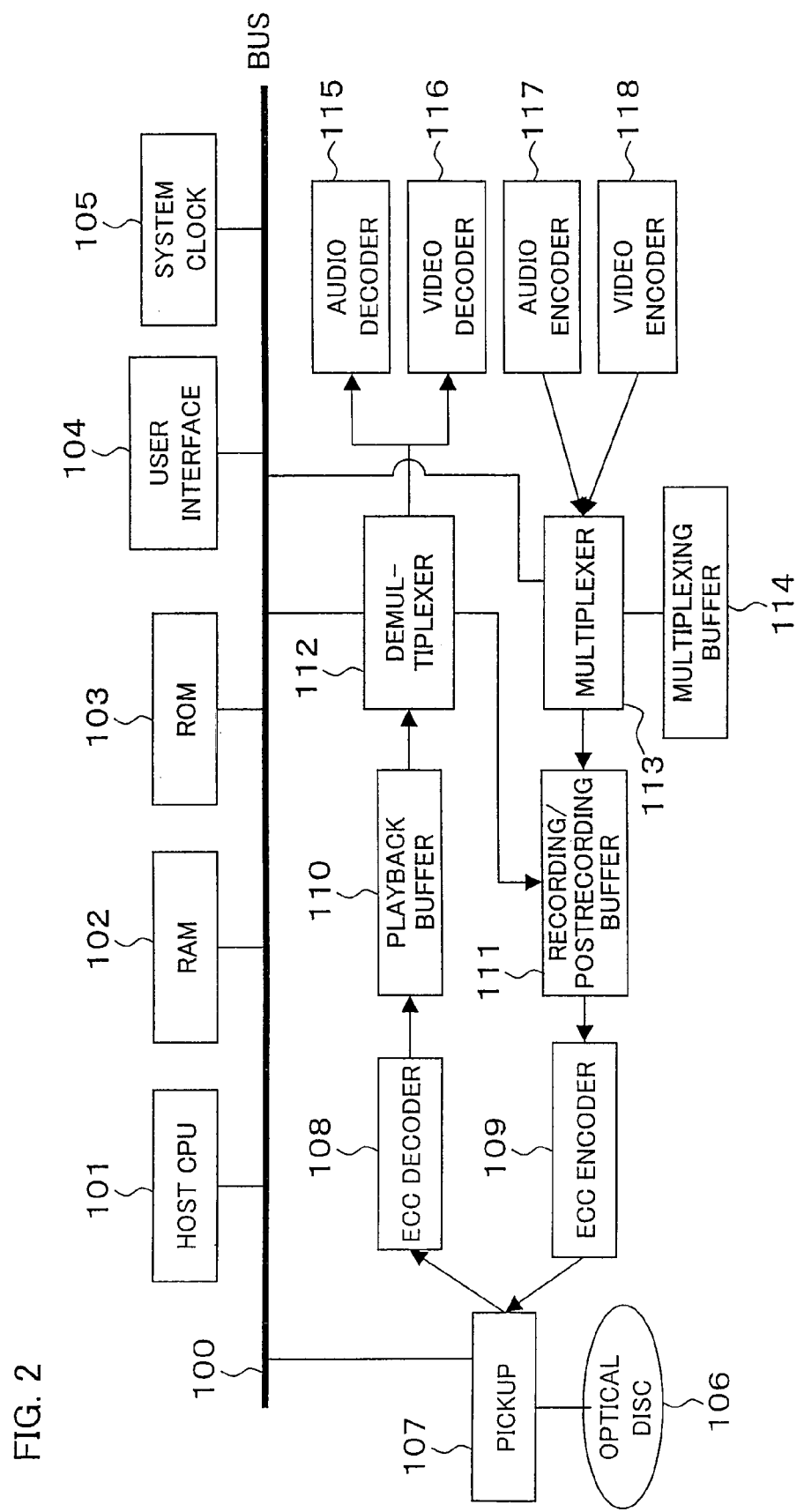
FIG. 2 is a block diagram schematically showing a data recording apparatus of the present invention.

FIG. 2 shows a post-recordable video disc recorder which is commonly used in the embodiments.

As shown in the figure, the video disc recorder includes: a bus 100; host CPU (Central Processing Unit) 101; RAM (Random Access Memory) 102; ROM (Read Only Memory) 103; user interface 104; system clock 105; optical disc 106; pickup 107; ECC (Error Correcting Code) decoder 108; ECC encoder 109; playback buffer 110; recording/postrecording buffer 111; demultiplexer 112; multiplexer 113; multiplexing buffer 114; audio decoder 115; video decoder 116; audio encode 117; and video encoder 118. In addition to them, the video disc recorder further includes a camera, microphone, speaker, display, and the like, which are not illustrated in the figure.

The host CPU 101 communicates with, via the bus 100, the demultiplexer 112, multiplexer 113, and the pickup 107. Although not being illustrated, the host CPU 101 also communicates with, via the bus 100, the audio decoder 115, video decoder 116, audio encoder 117, and video encoder 118.

To perform the playback, the data read out from the optical disc 106 using the pickup 107 is subjected to error correction in the ECC decoder 108, and is then temporarily stored in the playback buffer 110. In response to a data transmission request from the audio decoder 115 or video decoder 116, the demultiplexer 112 accordingly sends the data in the playback buffer 110 to a decoder suitable for the type of the data.

To perform the recording, the data compressed and encoded by the audio encoder 117 and video encoder 118 is supplied to the multiplexing buffer 114 via the multiplexer 113. The data is further AV-multiplexed by the multiplexer 113 and then supplied from the multiplexing buffer 114 to the recording/postrecording buffer 111. To the data in the recording/postrecording buffer 111, an error correction code is added by the ECC encoder 109. The data is then recorded onto the optical disc 106, using the pickup 107.

The audio data may be encoded by MPEG-1 Layer II, and the video data may be encoded by MPEG-2.

The optical disc 106 is arranged so that the recording and playback are performed in a spiral manner from the outer circumference to the inner circumference, and the optical disc 106 is a recording medium detachable to the video disc recorder. Also, in the optical disc 106, 2048 bytes constitute one sector, and an ECC block for error correction is made up of 16 sectors. To rewrite data in the ECC block, the followings must be done: the whole ECC block including the data is read out, the error correction is performed, the target data is rewritten, an error correction code is added again, an ECC block is composed and recorded onto the optical disc 106. In addition, the optical disc 106 adopts ZCAV (Zone Constant Angular Velocity) in order to improve the recording efficiency, and a recording area is made up of a plurality of zones with different speeds.

<File System>

The video disc recorder of the present embodiment adopts a file system to manage various types of information on the optical disc 106. The file system is recorded onto the optical disc 106, along with data (postrecording data, audio data, and video data). The file system may be UDF (Universal Disk Format), in consideration of interoperability with personal computers (hereinafter, PCs). On the file system, various types of management information and AV streams are dealt with as files.

A user area of the file system is managed by a logical block (one-to-one corresponding to the sector) with 2048 bytes. Each file on the user area is made up of an integral number of extents (sequential logical blocks), and the file may be recorded in the form of dispersed extents. A free space in the user area is managed using Space Bitmap and in units of logical blocks.

<File Format>

As a format for the AV stream management, QuickTime file format is adopted. The QuickTime file format is used for managing multimedia data, and has been developed by Apple Computer Inc. This format is popularly used in the field of PC.

The QuickTime file formant is made up of (i) video data, audio data, or the like (these types of data are collectively termed "media data") and (ii) management information. The media data and management information are collectively termed "QuickTime movie" (or simply "movie"). The media data and management information may be in a single file or may be in different files.

Figure 3:
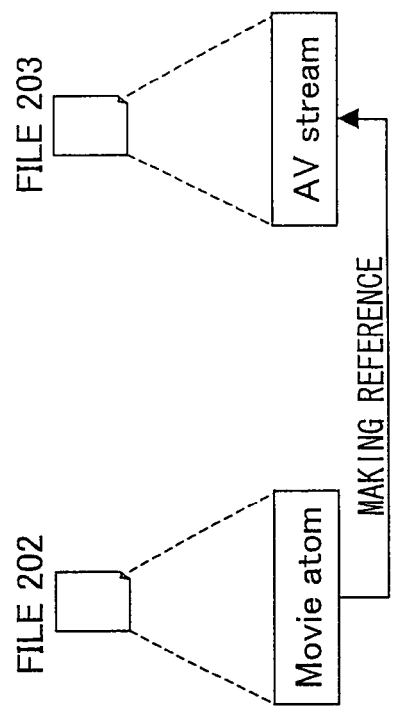
FIGS. 3(a)-3(c) show the relationship between management information and an AV stream in QuickTime file format.
Figure 3:
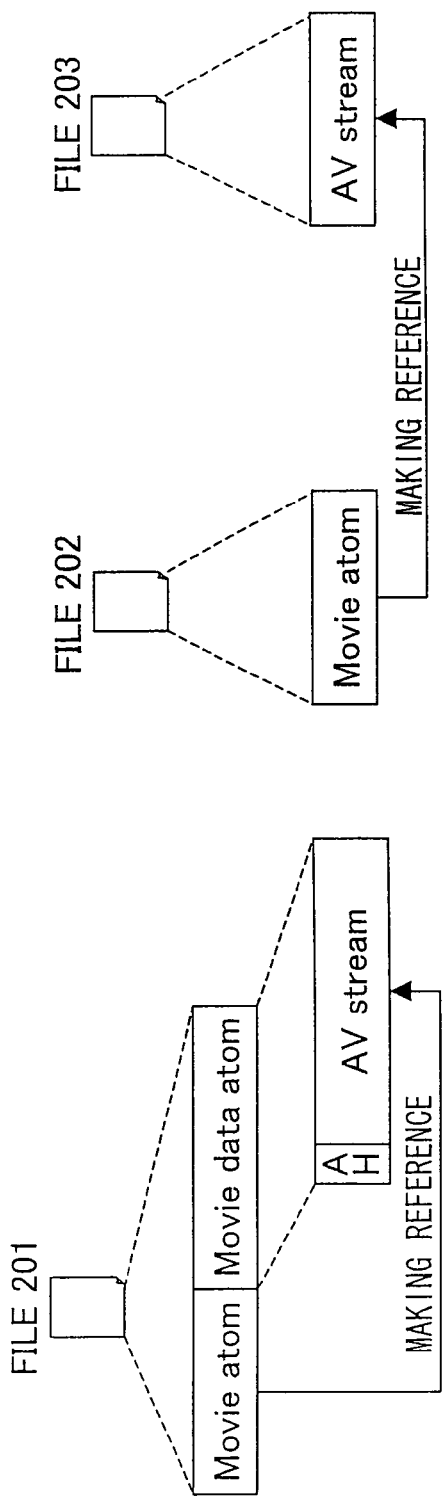
Figure 3:
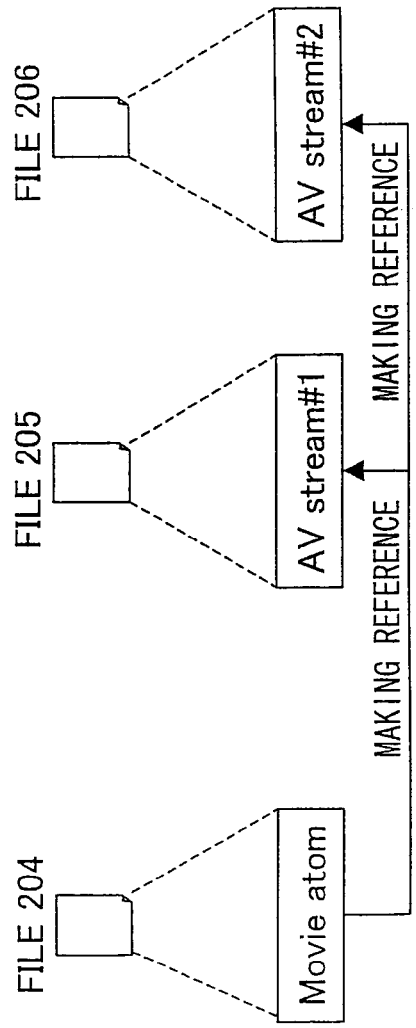

If the media data and management information exist in the same file, the file is configured as shown in FIG. 3(*a*). Various types of information are uniformly stored in the form of "atom". In a file 201, the management information is stored in "Media atom", and an AV stream of media data is stored in "Movie data atom". At the head of a Movie data atom, Atom header (AH) is provided. It is noted that the management information in a Movie atom includes, for instance, (i) a table for working out a relative position, in a file, of an AV stream corresponding to a particular period of time in media data, (ii) attribute information of media data, and (iii) external reference information which will be described later.

On the other hand, if the management information and media data are stored in different files, the arrangement shown in FIG. 3(*b*) is adopted. In this case, the management information in a file 202 is stored in a Movie atom. Meanwhile, it is unnecessary to store an AV stream in an atom, and hence the AV stream is stored in a file 203. Such a case is expressed as the Movie atom "externally refers to" the file 203 storing the AV stream.

In case of the external reference, as shown in FIG. 3(*c*), one file 204 that stores the management information can refer to a plurality of AV stream files (files 205 and 206 in the figure). This structure allows the nonlinear editing or nondestructive editing which makes it possible to apparently perform the editing without physically moving the AV stream. The structure also makes it possible to generate a plurality of user programs using identical scenes of AV streams recorded on the optical disc 106, and further allows a plurality of user programs to refer to a single set of postrecording data.

Now, referring to FIGS. 4-14, the format of the management information in QuickTime will be described. First, what is "atom", which is a common information storage format, is described. An atom always starts with "Atom size" indicating the size of the atom, and "Type" indicating the type of the atom. Type is made up of four letters, e.g. 'moov' is Type of Movie atom, and 'mdat' is Type of Movie data atom.

Atoms are hierarchically structured, so that an atom may include another atom. A structure of a Movie atom is illustrated in FIG. 4. Movie header atom manages the overall attribute of a movie managed by the Movie atom. Track atom stores information relating to tracks of video, audio or the like, which are included in the movie. User data atom can be arbitrarily defined by the user.

A structure of the Track atom is illustrated in FIG. 5. Track header atom manages the overall attribute of a track. Edit atom indicates which section of the media data is played back at what timing in the movie. Track reference atom manages the relationship with another track. Media atom manages actual video data, audio data, and the like.

A structure of the Track header atom is illustrated in FIG. 6. Note that this paragraph only explains the elements necessary in the later explanations. Flags is a group of flags indicating attributes. A representative one of Flags is Track enabled flag. If this flag is '1', the track associated with the flag is played back. If the flag is '0', the track is not played back. Track ID is an ID unique to each track. Layer indicates a spatial priority of the track. If there are a plurality of tracks for displaying images, an image of the track with the smallest Layer is displayed at the forefront.

A structure of Media atom is illustrated in FIG. 7. Media header atom manages the overall attribute or the like in regard of media data managed by the Media atom. Handler reference atom stores information indicating by which decoder the media data is decoded. Media information atom manages attribute information inherent to the media, e.g. video and audio.

A structure of the Media information atom is illustrated in FIG. 8. Media information header atom manages attribute information inherent to the media, e.g. video and audio. Handler reference atom is identical with that in the Media atom. Data information atom includes Data reference atom that manages the name of a file including the media data being referred to by the associated QuickTime movie. Sample table atom manages the size of data, playback time, and the like.

Figure 9:
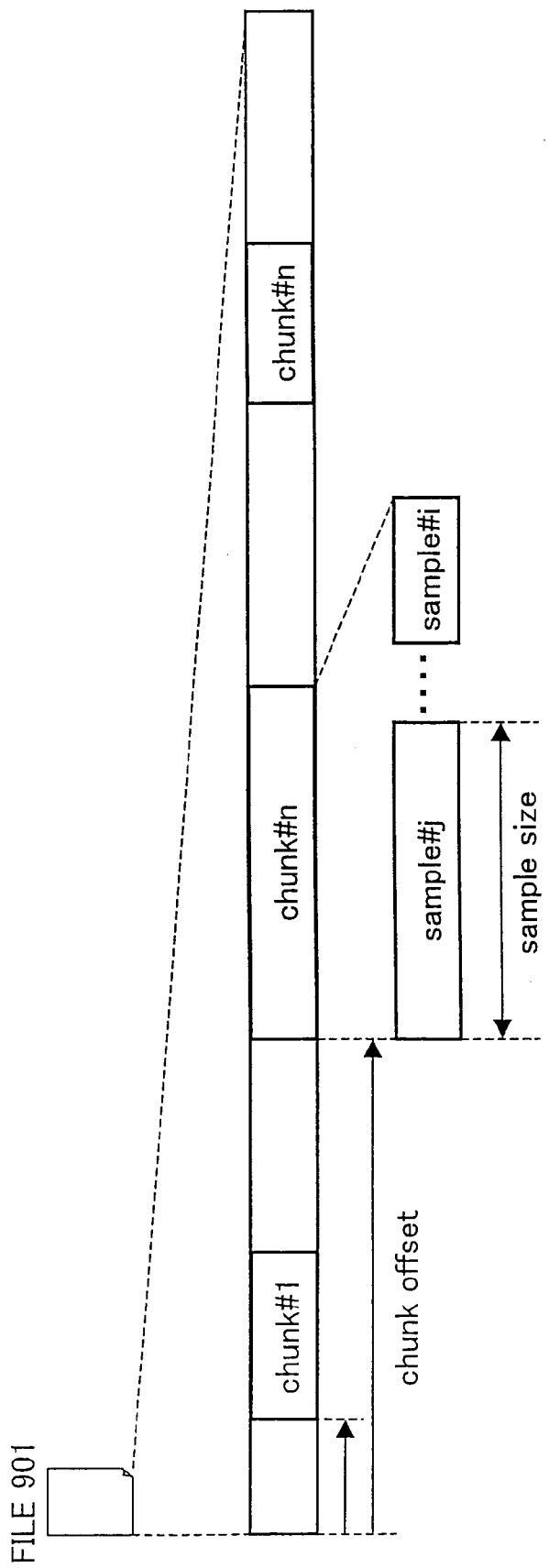
FIG. 9 shows an example of data management using a Sample table atom.

Before describing Sample table atom, how data is managed in QuickTime is described in reference to FIG. 9. In QuickTime, the minimum unit (e.g. video frame) of data is termed "sample". In each track, samples have the numbers (sample numbers) which start from 1 and correspond to the order of playback.

Also, according to the QuickTime format, the playback time length and data size of each sample are managed. In the file, there are areas in which samples belonging to the same track are serially disposed in line with the order of playback. Such an area is termed "chunk". Chunks also have the numbers that starts from 1, in accordance with the order of playback. In short, according to the QuickTime format, a file 901 is composed by serially disposing the chunks.

According to the QuickTime format, the followings are managed: (i) an address, of each chunk, from the top-of-file, and (ii) the number of samples included in each chunk. With these types of information, it is possible to locate the sample corresponding to a particular time.

A structure of Sample table atom is illustrated in FIG. 10. Sample description atom manages, for example, Data Format of each chunk and an index of the chunk in a file, in which chunk the associated sample is stored. A structure of Sample description table is illustrated in FIG. 11(*a*). In the figure, number-of-entries indicates the number of data formats that are used, and the number of existing Sample description table corresponds to the number-of-entries. FIG. 11(*b*) shows an example of audio Sample description table.

In Sample table atom shown in FIG. 10, Time-to-sample atom manages the playback time of each sample. Sync sample atom manages, among samples, which sample is readily decodable. Sample-to-chunk atom manages the number of samples in each chunk. Sample size atom manages the size of each sample. Chunk offset atom manages an address, of each chunk, from the top-of-file.

As shown in FIG. 12, Edit atom includes one Edit list atom. The Edit list atom has groups (entries) each including Track duration, Media time, and Media rate. The number of the entries in the Edit list atom is specified by Number of entries. Each entry corresponds to a section where, on the track, samples are played back in sequence. The entries are disposed in line with the order of playback on the track.

Track duration indicates how long, on the track, the section managed by the entry is played back. Media time indicates that position on the media data which corresponds to the head of the section managed by the entry. Media rate indicates the playback speed in the section managed by the entry. If Media time is '−1', the playback of the sample in the track is stopped for a time period corresponding to the Track duration of the entry. This time period is termed "empty edit".

Figure 13:
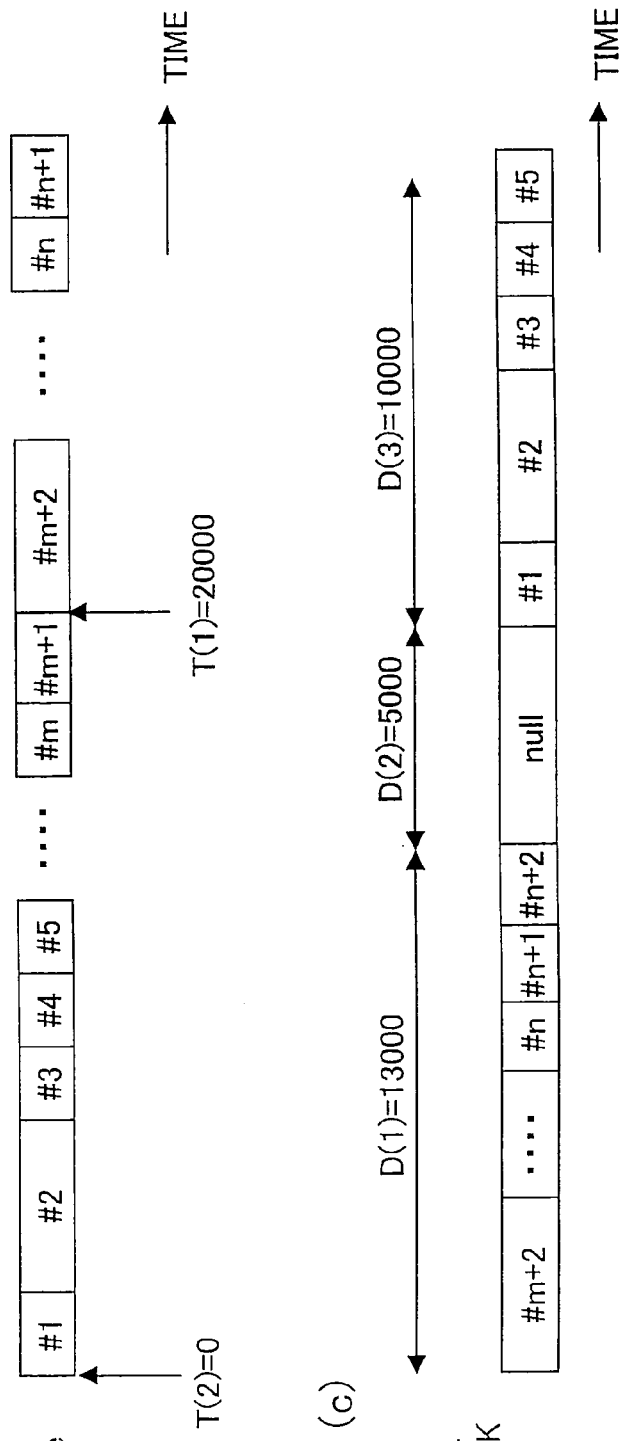
FIGS. 13(a)-13(c) show examples of playback range designation by the Edit atom.

FIG. 13 shows an example of how Edit list is used. In the example, the content of Edit list atom is as shown in FIG. 13(*a*), and the configuration of the sample is as shown in FIG. 13(*b*). Also, in the example, Track duration of an i-th entry is indicated as D(i), Media time thereof is indicated as T(i), and Media rate thereof is indicated as R(i). The playback of the sample is actually performed in the order shown in FIG. 13(*c*). This will be briefly described below.

First, in the entry #1, Track duration is 13000, Media time is 20000, and Media rate is 1. Therefore, from the head of the track to 13000, the sections with the times from 20000 to 30000 in the sample are played back. Then, in the entry #2, Track duration is 5000 and Media time is −1. Therefore, no playback is performed during the sections with the times from 13000 to 18000 in the track. In the entry #3, Track duration is 10000, Media time is 0, and Media rate is 1. Therefore, during the sections with the times from 18000 to 28000 in the track, the sections with the times from 0 to 10000 in the sample are played back.

FIG. 14 shows the configuration of User data atom. This atom can store an arbitrary number of pieces of original information not defined in the QuickTime format. One piece of original information is managed by one entry. One entry is composed of Atom size, Type, and User data. Atom size indicates the size of the entry, Type indicates identification information for differentiation between the pieces of the original information, and User data indicates the actual data.

<Index File>

In order to manage the QuickTime movies in the disc, one special QuickTime movie file which is termed "index file" is provided in the disc.

What are registered in the index file are thumbnails and various types of attributes in regard of files in the disc (files are, for instance, QuickTime movies and still images referred to by the QuickTime movies). The attributes include "link count" that indicates how many times the file is externally referred to.

Referring to the link count makes it possible to easily recognize if there is another file referring to the file or not. Therefore, it is possible to prevent the file, which is referred to by another file, from being mistakenly deleted.

<Form of AV Stream>

Figure 15:
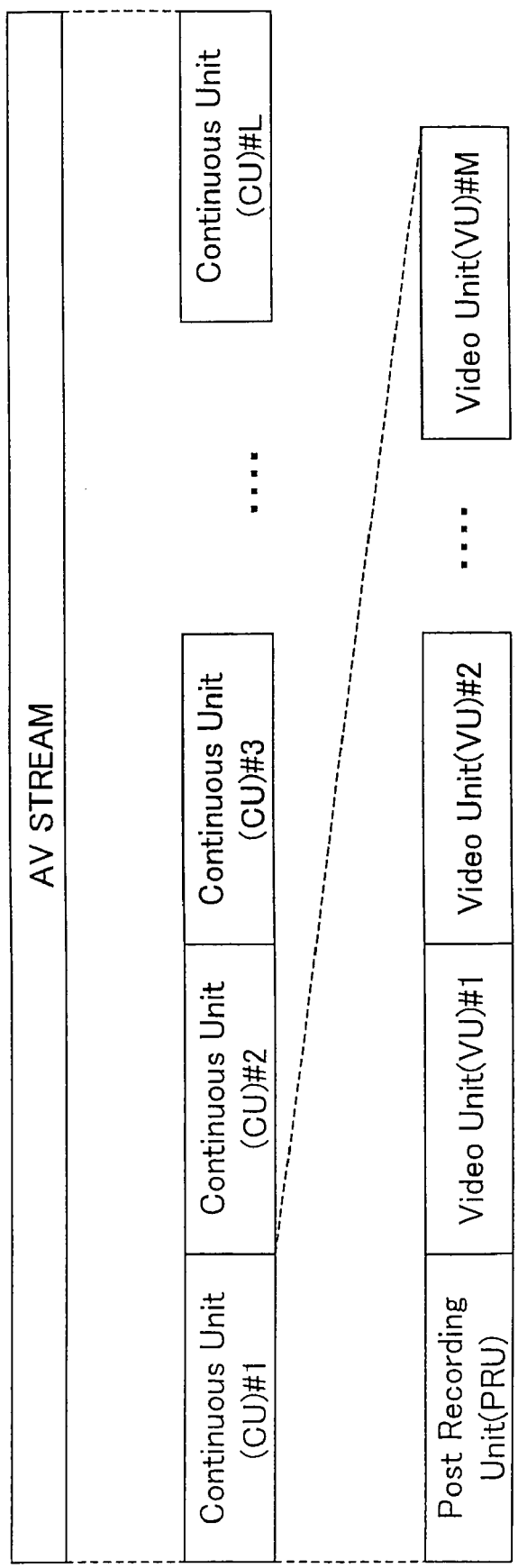
FIG. 15 shows an AV stream.

FIG. 15 shows the form of an AV stream. The AV stream is made up of an integral number of Continuous Units (CU). CUs are units that are serially recorded onto the disc. The AV stream is arranged so that the border between CUs corresponds to the border between the ECC blocks. The CU is made up of one Post Record Unit (PRU) and an integral number of Video Units (VU). The VU is a unit that can be independently played back, and a group of VU corresponds to the aforesaid original block. The PRU corresponds to the aforesaid postrecording data block. The area size of the PRU is figured out by multiplying the playback time of the CU by the maximum audio bit rate.

<File System Format>

Figure 16:
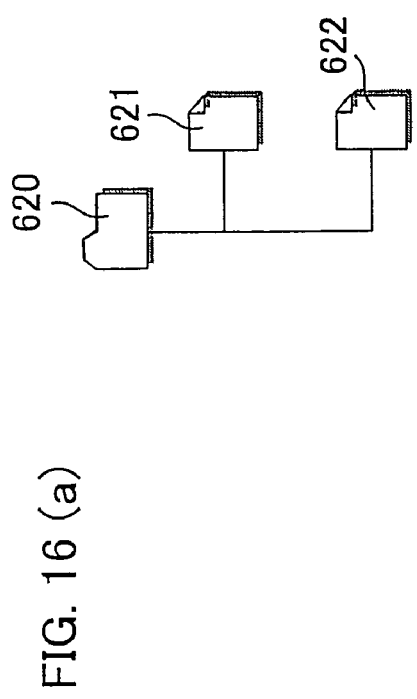
FIGS. 16(a) and 16(b) show how management information is arranged in UDF.
Figure 16:
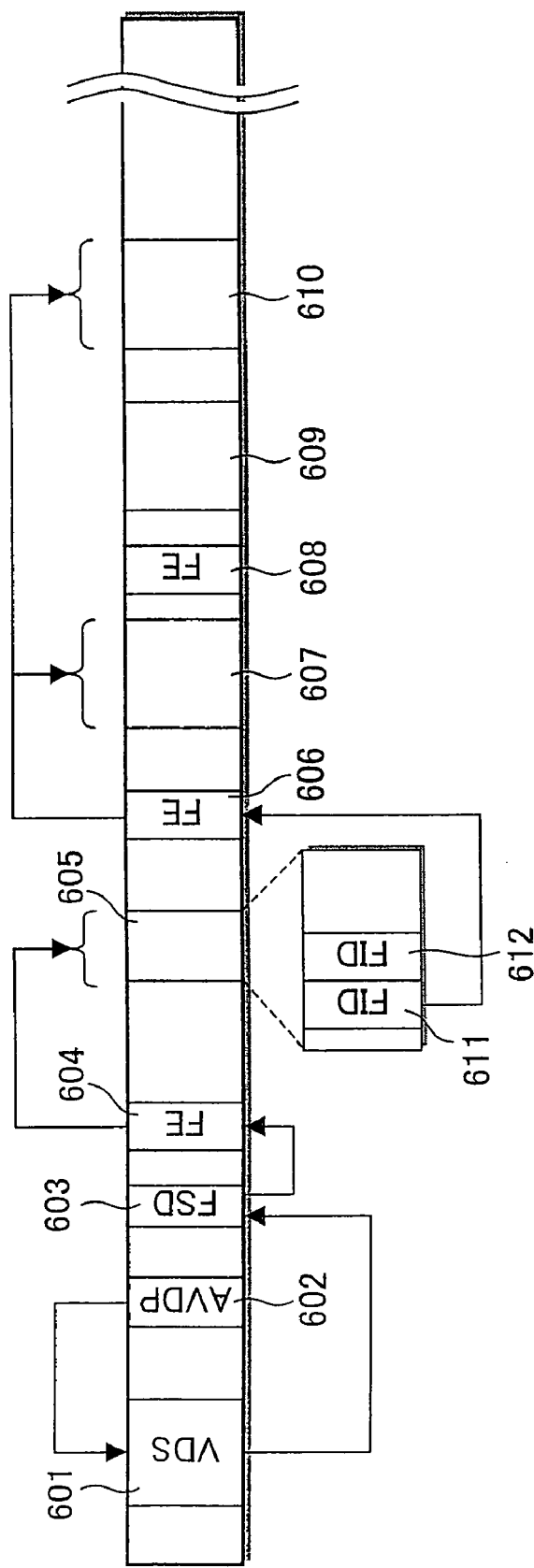

The format of the file system used for describing the present invention is UDF (Universal Disk Format). The following will describe the UDF in reference to FIG. 16. FIG. 16(*b*) shows a case where the directory/file configuration shown in FIG. 16(*a*) is recorded by the UDF. AVDP 602 in the figure is an abbreviation of Anchor Volume Descriptor Pointer, and corresponds to an entry point used for searching the management information of the UDF. The AVDP 602 is typically recorded in 256th sector, N-th sector, or (N-256)-th sector (N indicates the maximum logical sector number). VDS 601 is an abbreviation of Volume Descriptor Sequence, and records management information regarding volume, which information is an area managed by the UDF. The number of volume in one disc is typically one, and the volume typically includes one partition. FSD 603 is an abbreviation of File Set Descriptor, and one FSD 603 exists in the partition. The positional information in the partition is indicated by a logical block number that corresponds to a sector number counted from the head of the partition. Incidentally, one logical block corresponds to one sector. Meanwhile, although not being illustrated, each partition includes a table that indicates whether or not a logical block termed "Space Bitmap" has already been allocated to the file.

FSD 603 includes the positional information (which is composed of a logical block number and the number of logical blocks, and is termed "extent") of FE604 which is a File Entry (FE) of the root directory. The FE manages the group of extents. By rewriting, adding, or deleting the extents, one can reorder the sets of actual data constituting the file, insert data, and delete data. The FE604 manages an area 605 that stores a group of File Identifier Descriptors (FID) storing the files directly under the root directory, the names of directories, and the like. FID 611 and FID 612 in the area 605 include the respective file names of the files 621 and 622, and the respective sets of positional information of the FE 606 and FE 608 managing the groups of extents. FE 606 manages, as extents, areas 607 and 610 constituting the actual data of the file 621. FE 608 manages, as extents, an area 609 that constitutes the actual data of the file 622. In this case, one can access the actual data of the file 621, by following a link in the following order: AVDP 602, VDS 601, FSD 603, FE 604, FID 611, FE 606, area 607, and area 610.

Embodiment 1

Embodiment 1 of the present invention will be described in reference to FIGS. 1 and 17-24.

The main point of discussion here is processing in regard of postrecording. For this reason, processing of an AV stream of an original program is not particularly explained here.

<Processing in Initial Recording>

PRU is an area reserved for postrecording data, at the time of recording an original program. A postrecording file is generated at the time recording an AV stream, and the aforesaid area is managed as dummy data.

In the management information of the original program, a non-allocated track is generated. This non-allocated track is used for managing an area in the PRU area, in which area no postrecording data is recorded. At the time of the initial recording, the PRU area in each CU is assumed as one sample, and a sample table is generated. This sample table manages positions, sizes, and time information of all PRU areas. As to the aforesaid non-allocated track, the Track Enabled flag of the Track header atom is set at 0 to indicate that the track is not the target of playback.

<Processing in Recording of Postrecording Data>

Now, the following will be described: a user program that externally refers to the original program is generated, and postrecording data is recorded to the user program. The description below assumes that the user program to be generated is an extract from the original program.

The user program is generated in such a manner that the sample table of the section in the track of the AV stream data, which section is specified by the user, is copied from the management information of the original program.

Figure 1:
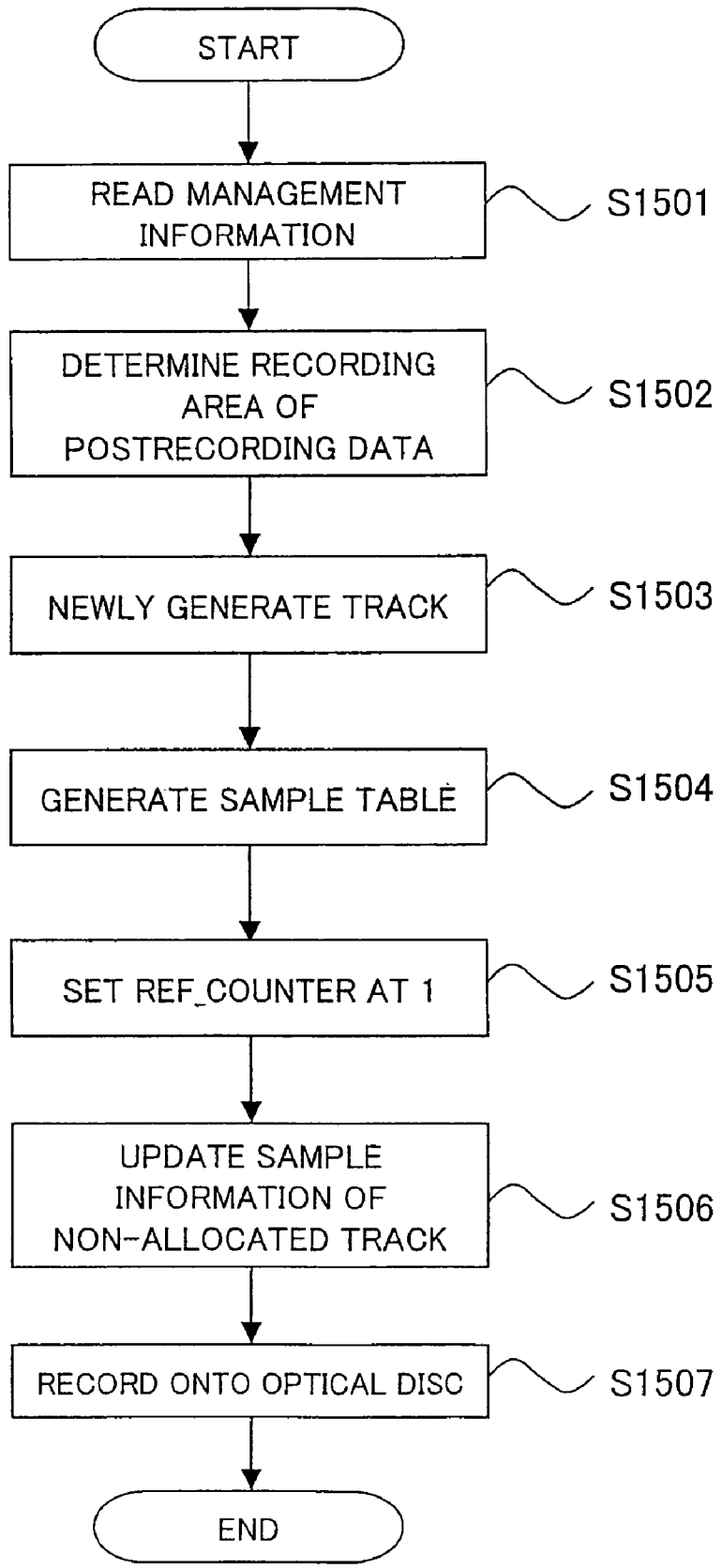
FIG. 1 relates to an embodiment of the present invention, and is a flowchart showing the processing in recording postrecording data.

The following illustrates the processing in the addition of postrecording data to the above-described user program, in reference to FIG. 1. First, QuickTime management information of the user program is read out and stored in the RAM 102. Also, an original program is specified in reference to the file name described in the Data reference atom in the management information of the user program, and QuickTime management information of the original program to be referred to is read out and stored in the RAM 102 (S1501).

Subsequently, the position of the PRU in the section specified by the user, to which PRU the postrecording data is ought to be recorded, is specified by searching, in the sample table of a non-allocated track of the original program, a part temporarily corresponding to the video data that is the target of the postrecording. If the postrecording data to be recorded is audio data, it is determined if the data is smaller than the size of the PRU managed by the non-allocated track or not, by figuring out the data amount from the bit rate (S1502).

If the postrecording data is graphic data, it is determined if the graphic data to be recorded is smaller than the size of the PRU. More specifically, the postrecording data is divided in accordance with the stream playback time in units of CUs and the divided pieces of data are recorded onto the respective PRU areas which are evenly provided on the disc. Therefore, the determination is carried out after checking the sizes of all areas to which PRUs are not allocated, in the postrecording section specified by the user.

After determining the areas to which the postrecording data is recorded, the postrecording data is actually recorded onto those areas.

When the recording of the postrecording data finishes, a track is newly generated on the original program side (S1503). This track manages the postrecording data. Subsequently, a sample table for managing the recorded postrecording data is generated (S1504).

To manage the number of times to refer to the data, reference management atom ('rfmg'), which is an original Atom type, is defined in User data atom ('udta') in the Track atom, as shown in FIG. 17. In this reference management atom, a field 'ref_counter' that indicates the number of times to refer to the data is defined.

That is, after generating the Sample table, the reference management atom is generated in the User data atom, and the ref_counter field is set at '1' indicating that the data is referred to once (S1505).

Then the chunk offset and size in the sample table of the non-allocated track of the original program are updated in such a manner as to correspond to the remaining PRU areas after the recording of the postrecording data (S1506).

Subsequently, a track for playing back the recorded postrecording data is newly generated also on the user program side, and a sample table of the postrecording track is generated as in the case of the original program which has been generated earlier.

Finally, the pieces of QuickTime management information of the original program and the user program, those pieces of information being on the RAM 102, are recorded onto the optical disc 106 (S1507).

In the above-described flow, if the video disc recorder is structured as shown in FIG. 2, the steps S1502 to S1506 are performed by the host CPU 101 and with respect to the pieces of QuickTime management information of the original program and the user program, those pieces of information having been read out and stored in the RAM 102. The pieces of QuickTime management information of the original program and the user program, those pieces of information having been subjected to the steps S1502 to S1506, are read out from the RAM 102 in response to the control by the host CPU 101. The pieces of QuickTime management information are then recorded onto the optical disc 106, via the bus 100 and pickup 107.

In the meanwhile, if there is no non-allocated area in S1502, the following may be done: the size of the area for allocation is reduced by decreasing the bit rate used for the postrecording, and it is checked again if there is an area for allocation. If there is still no non-allocated area even if the reduction was performed, The recording may be performed onto an area which is not the PRU areas of the AV stream. As to the section for the postrecording, if there is no area to record that section, the recording of that section may be performed onto an area which is not the PRU area.

Figure 18:
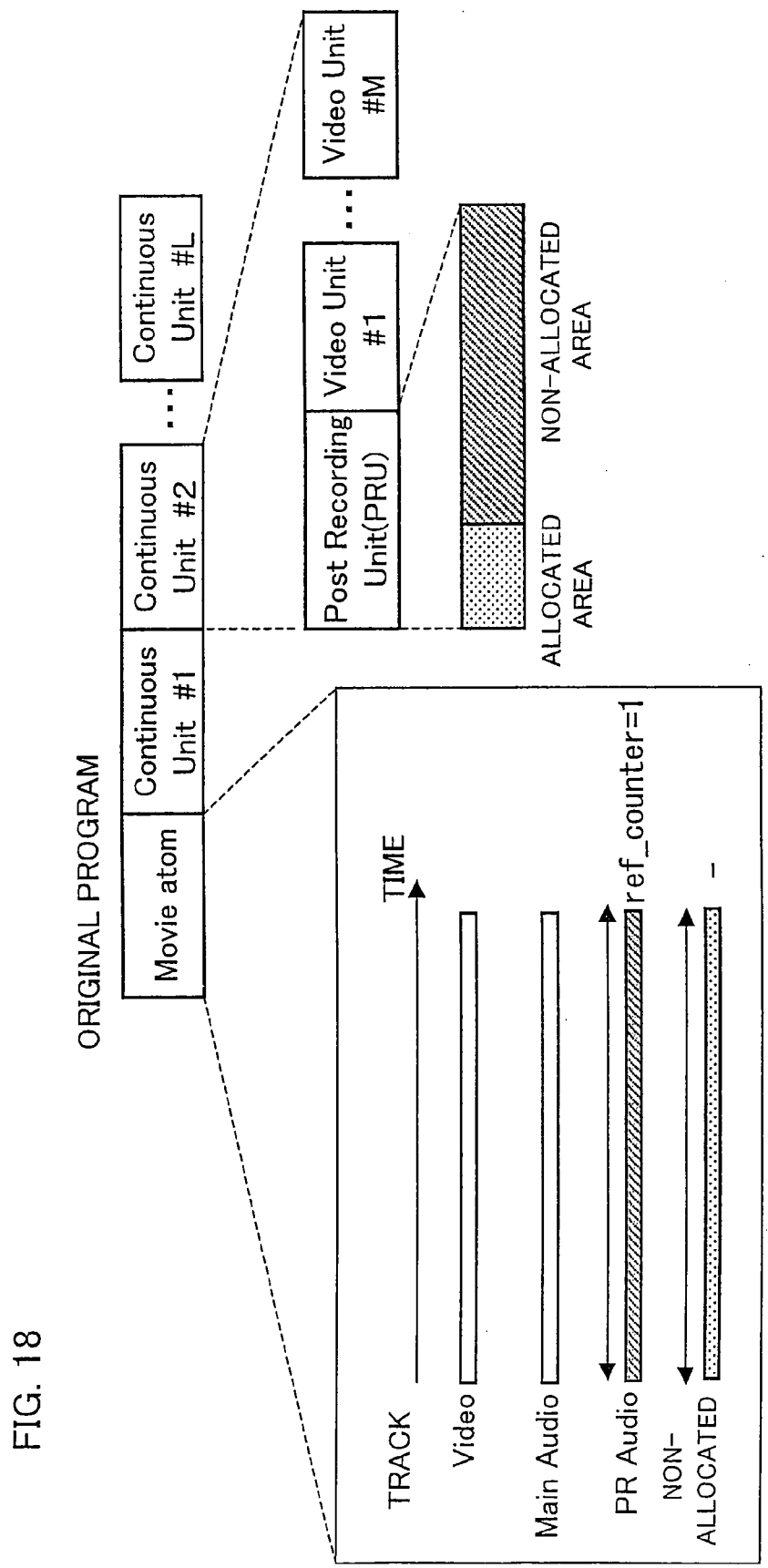
FIG. 18 shows management information of an original program immediately after being recorded, in Embodiment 1 of the present invention.

The original program after the recording of the postrecording data is shown in FIG. 18. The PRU in the section where the postrecording data is recorded is composed of (i) an area (allocated area) where the postrecording data is recorded and (ii) a non-allocated area. The Movie atom, which is the management information of the original program, has four types of tracks: Video track, Main Audio track, Postrecording track (PR Audio in the figure), and non-allocated track. The Movie atom has information on an address, size, playback time, and the like of the data of each track.

The same processing is performed in a case where, after the recording of one type of postrecording data, another type of postrecording data is added, except that no file is newly generated. FIG. 19(a) shows the state of the PRU before the addition of the postrecording data. FIG. 19(b) shows the state of the PRU after the addition of the postrecording data. In FIG. 19(b), subsequent to a postrecording #A track having already been recorded, a postrecording #B track is generated for the postrecording data to be added. The pieces of the postrecording data are managed in units of tracks. To the Chunk offset, the starting position of the new postrecording data in the PRU is set. In the figure, the new postrecording data is recorded immediately after postrecording data which has already been recorded. Not being limited to this arrangement, the new postrecording data may be recorded onto any position in the non-allocated area. Each time new data is added, the Chunk offset and Sample size of the non-allocated track are updated in accordance with remaining areas.

Figure 20:
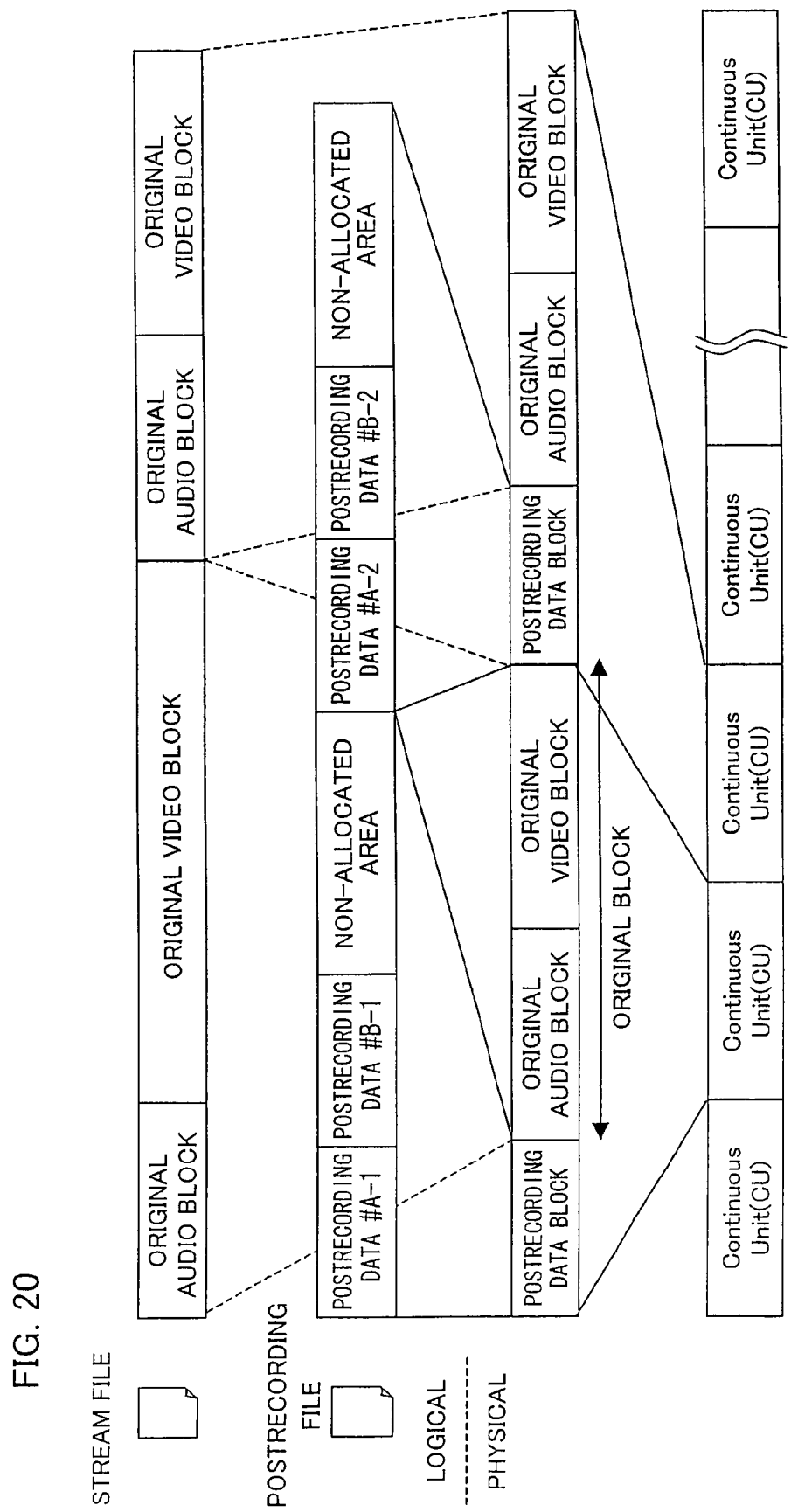
FIG. 20 shows the relationship between data allocation on the disc and files, in Embodiment 1 of the present invention.

On the file system, as shown in FIG. 20, the postrecording data is treated, in the original block, as a file externally referring to one file (stream file), and is treated, in the postrecording data block, as a file externally referring to one file (postrecording file). Therefore, more than one pieces of postrecording data exist in the postrecording file.

Even if more than one pieces of postrecording data exist in the postrecording file, the number of times of reference is easily managed by sorting the tracks in accordance with the types of postrecording data and providing ref_counter to each track.

<Processing in Generating User Program>

Figure 21:
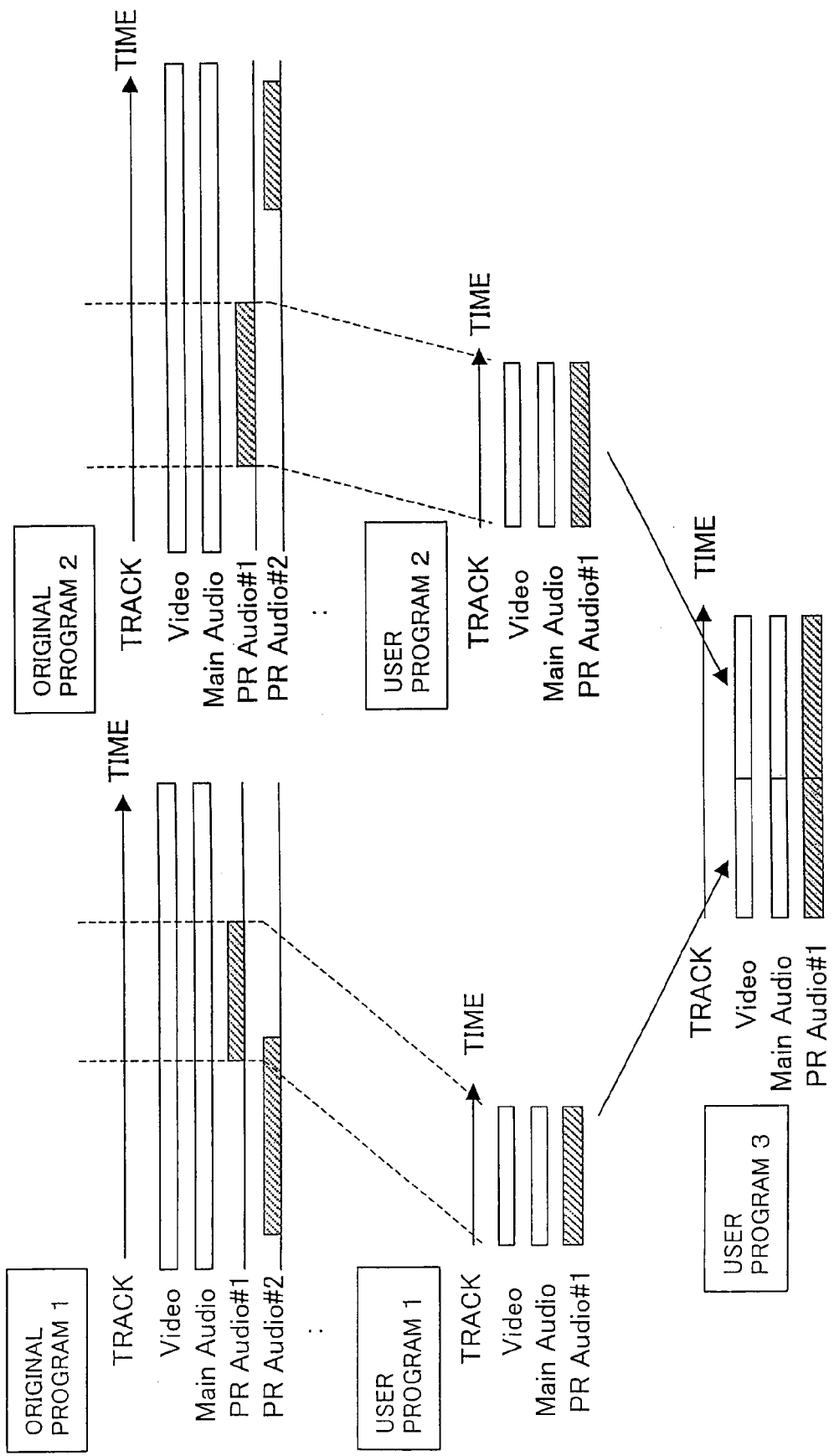
FIG. 21 shows an example of editing of a user program in Embodiment 1 of the present invention.

The following will describe the processing when the user program with the postrecording data is further subjected to nondestructive editing. In the description below, it is assumed that a user program 3 in which a user program 1 is merged with a user program 2 is generated as shown in FIG. 21.

First, the pieces of management information of the user programs 1 and 2 are read out and stored in the RAM 102, and these programs 1 and 2 are merged into the user program 3. Also, an original program is specified in reference to the reference file name in Data reference atom of the user program 3, and management information regarding the original program is read out and stored in the RAM 102.

Subsequently, in regard of the management information of the original program, samples which to which the postrecording has been done and which have an identical offset are searched in the chunk offset information of the postrecording tracks of the user program 3, so that, among more than one piece of postrecording data, a piece of postrecording data to which the user program 3 refers is specified. Also, red_counter, which is in the reference management atom ('rfmg') of the udta atom in the track atom corresponding to the piece of postrecording data thus searched, is increased by 1.

Finally, the pieces of the management information of the original program and the user program, the pieces of the management information being on the RAM 102, are recorded onto the optical disc 106.

<Processing in Deletion of User Program>

Figure 22:
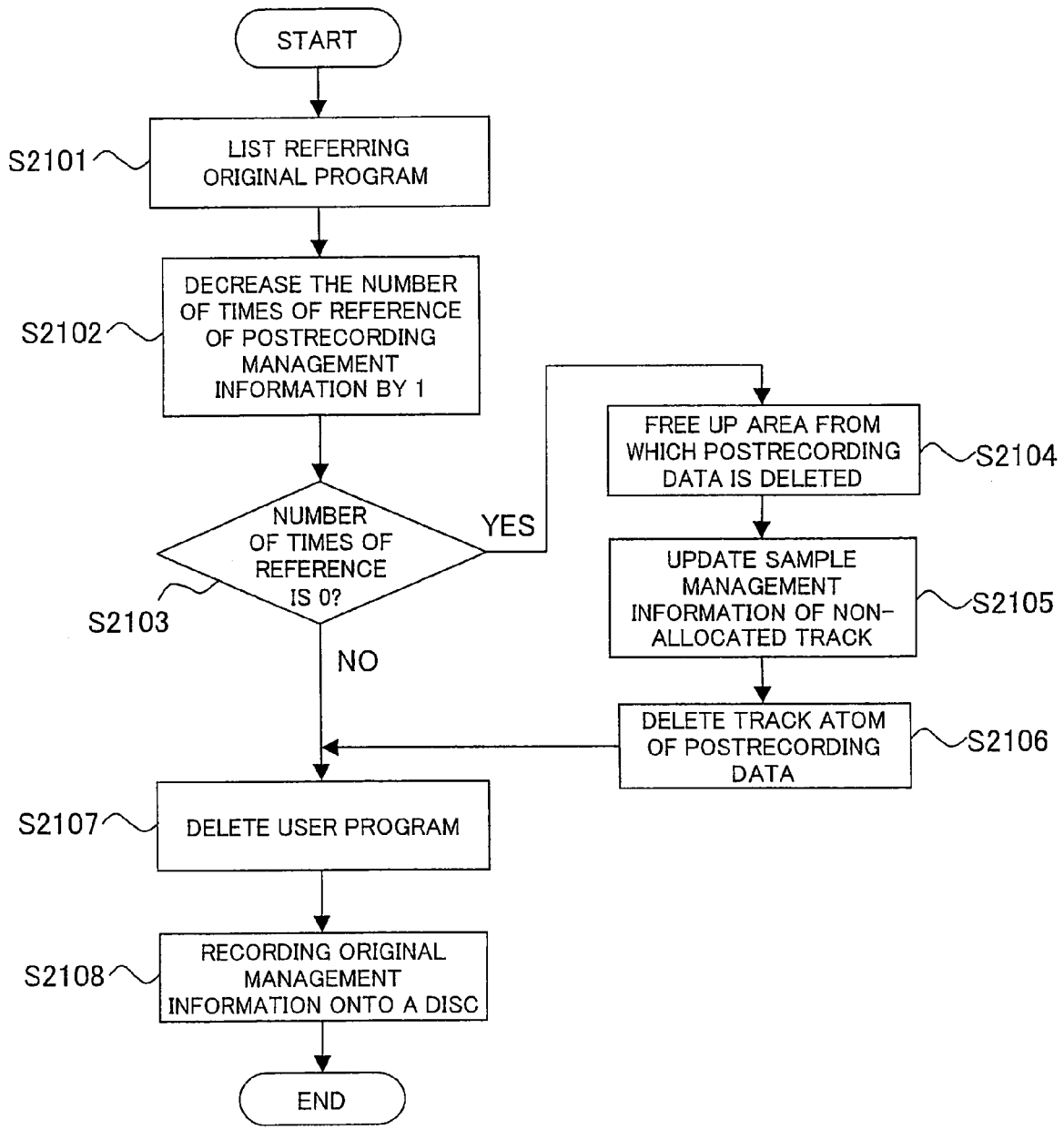
FIG. 22 is a flowchart showing the processing in deletion of a user program, in Embodiment 1 of the present invention.

The following will describe the processing in a case where the user instructs the deletion of the user program, in reference to FIG. 22. It is noted that, at the beginning, the management information of the user program to which the instruction of deletion is made is read out and stored in the RAM 102.

First, a track in the management information of the user program is examined, and an original program managing the postrecording data to which that user program refers is listed (S2101). The processing finishes if there is no track managing the postrecording data.

Subsequently, the following steps are performed in regard of the original program thus listed. First, the management information of the original program is read out and stored in the RAM 102. Then a corresponding postrecording track in the original program is searched in the chunk offset information of the postrecording tracks of the user program, and ref_counter of the track thus searched is decreased by 1 (S2102).

Whether or not the ref_counter is 0 is checked (S2103). If the ref_counter is 0, deletion is carried out and the area corresponding to the track is freed up (S2104), and the sample management information of a non-allocated track is updated in such a manner as to change the freed area into a non-allocated area (S2105). Also, Track atom associated with the deleted postrecording data is deleted from the management information of the original program (S2106). These steps are the opposite to those performed at the time of recording the postrecording data.

Finally, the file storing the user program is deleted from the optical disc 106 (S2107), and the management information of the original program is recorded onto the optical disc 106 (S2108).

If the ref_counter is not 0 in S2103, it is indicated that there is another program that refers to the aforesaid postrecording data. In such a case, the processing goes to S2107 without performing S2104 to 2106, i.e. without performing the deletion of the postrecording data.

Figure 23:
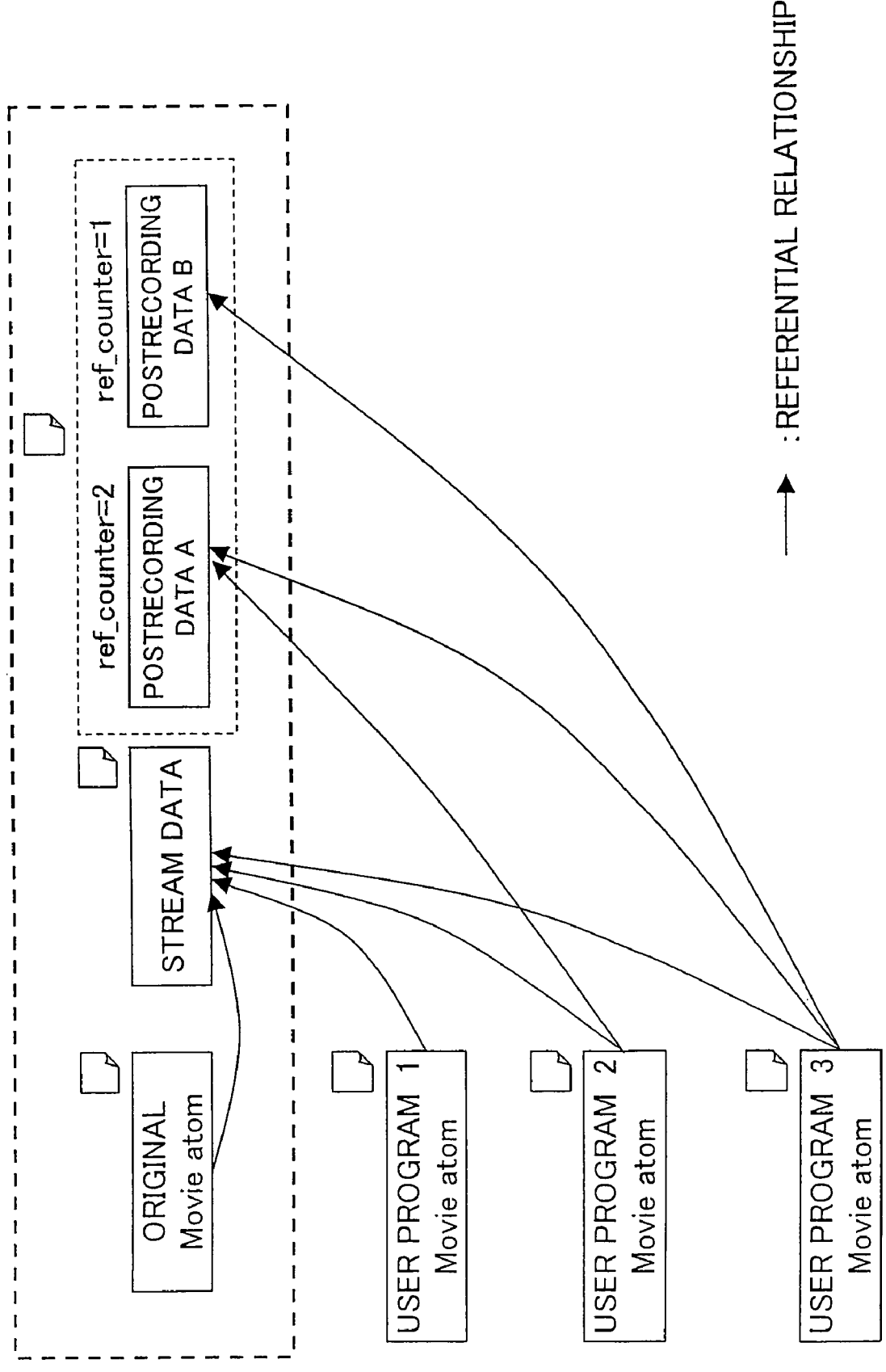
FIG. 23 shows in what manner the user programs immediately before the deletion refer to data, in Embodiment 1 of the present invention.
Figure 24:
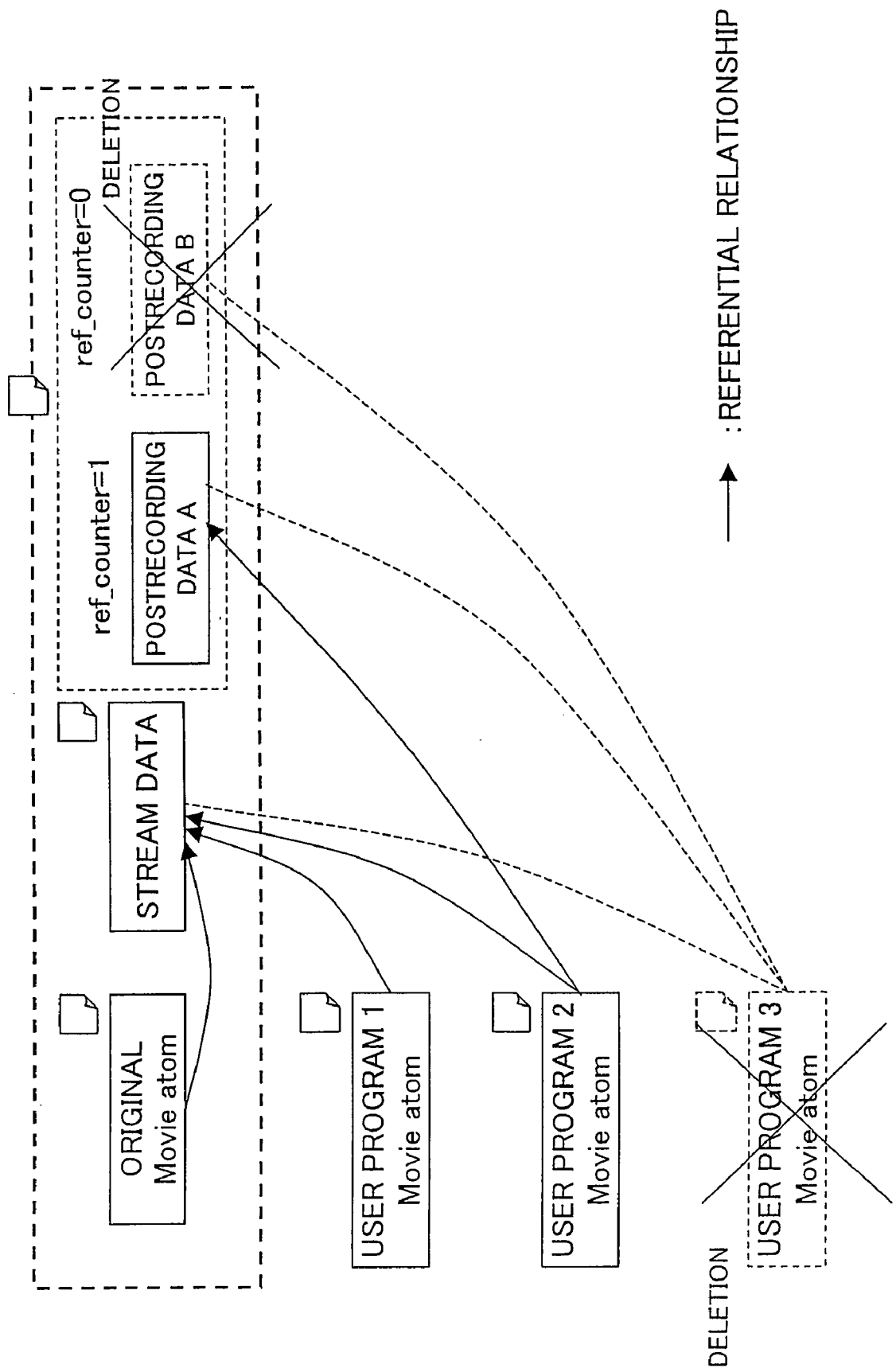
FIG. 24 shows in what manner the user programs immediately after the deletion refer to data, in Embodiment 1 of the present invention.

For example, assume that files refer to others as shown in FIG. 23, and a user program 3 among the files is deleted. The user program 3 refers to postrecording data A and postrecording data B. To delete the user program 3, the ref_counter of each of the postrecording data A and postrecording data B is decreased by 1, so that the ref_counter of the postrecording data A becomes 1 and the ref_counter of the postrecording data B becomes 0, as shown in FIG. 24.

That is, since the postrecording data B is referred to only from the user program 3, the postrecording data B is deleted along with the deletion of the user program 3. In the meanwhile, since the postrecording data A is referred to also from another user program (user program 2 in this case), the postrecording data A is not deleted.

<Variant Example of Embodiment 1>

In Embodiment 1, a field indicating the number of times of reference is provided in the udta atom. The present invention, however, is not limited to this arrangement.

For example, the information indicating the number of times of reference may be provided in a Sample description table in Sample description atom. That is, Sample description is generated for each piece of postrecording data. This makes it possible to perform the management by the Sample description atom, without presupposing the division of a track for each piece of postrecording data. For this reason, a data amount of the management file can be reduced. However, since QuickTime does not allow samples having overlapping playback times to be simultaneously provided in one track, the track must be divided in the case above. Even if the track is divided, the management of the postrecording data can be performed in a detailed manner, by providing, in the Sample description table, the information indicating the number of times of reference.

For instance, in a case where the codec in the first half of postrecording data is different from that of the second half of the postrecording data, so that Sample description is different between the first half and second half, the deletion of the user program which records postrecording data can be performed as follows: even if the postrecording data is referred to from another user program, if the range of the reference is only the first half, the second half of the postrecording data can be deleted and the area where the data of the second half is recorded can be freed up.

The reference management atom may include not only the ref_counter indicating the number of times of reference but also the file name of the user program referring to postrecording data. This makes it possible to carry out the following: in a case where the user instructs the deletion of postrecording data, it is possible to present, to the user, not only whether or not the postrecording data is referred to from another user program file but also which file refers to the postrecording data.

Furthermore, the reference management atom may include information on a reference range which indicates which part of the postrecording data is referred to from a user program. With this reference range information, it is possible to delete only an unnecessary part of the postrecording data when the postrecording data is referred to from a plurality of user programs, thereby making it possible to effectively utilize the PRU area.

Embodiment 2

The following will describe Embodiment 2 of the present invention. In this embodiment, being different from Embodiment 1, pieces of data to which postrecording is carried out are managed as different files. Since Embodiment 2 is similar to Embodiment 1, the description is focused on the differences therebetween.

Figure 25:
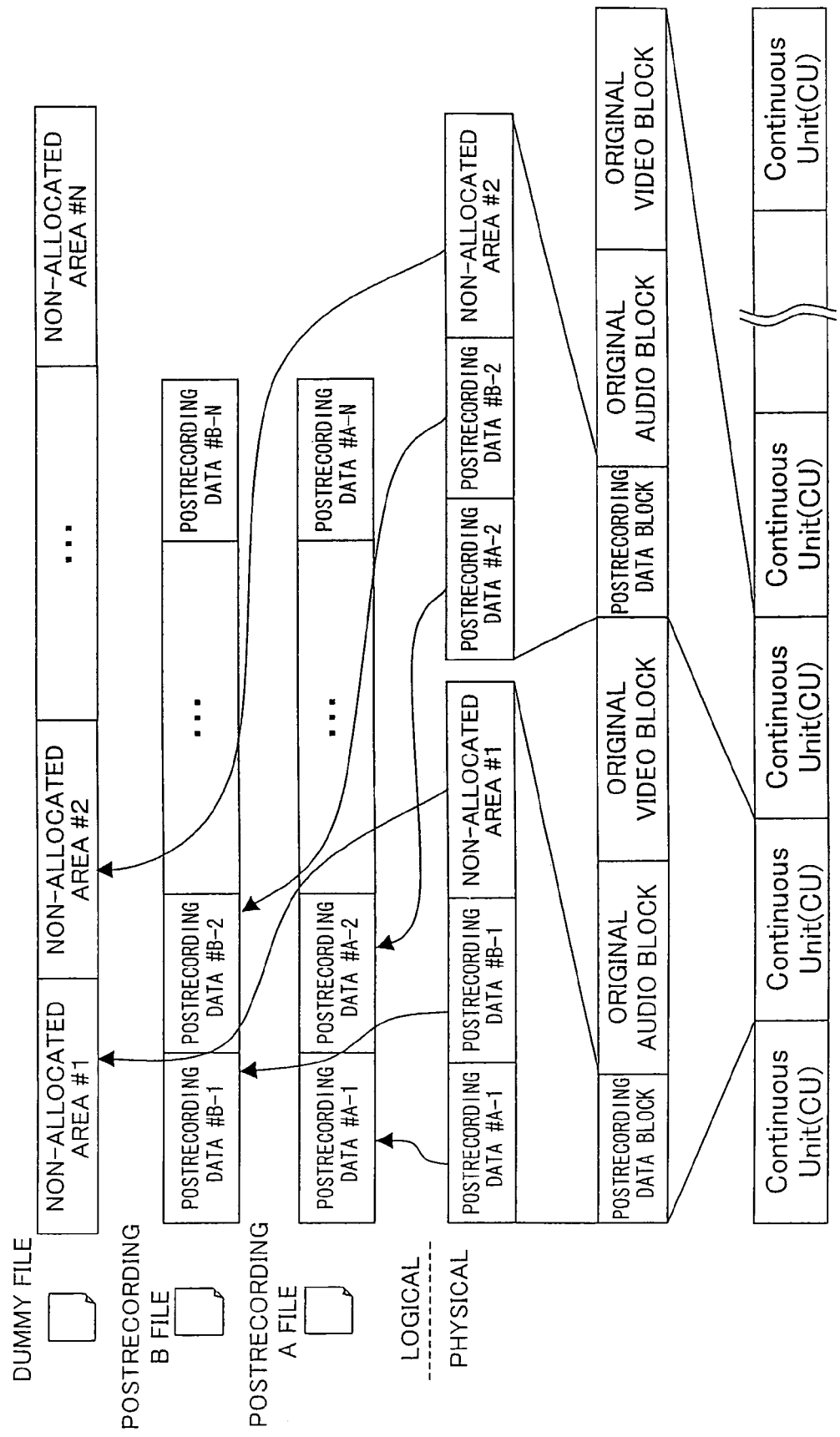
FIG. 25 shows the relationship between data allocation on the disc and files, in Embodiment 2 of the present invention.

FIG. 25 shows the configuration on the disc and the relationship between files, in a case where there are two types of postrecording data. In terms of physical recording on the optical disc 106, a postrecording data block and an original block (i.e. an original audio block and an original video block) are provided in each CU. The postrecording data block is made up of an area for recording postrecording data #A, an area for recording postrecording data #B, and a non-allocated area. Data related to the postrecording data #A is managed by a postrecording A file, data related to the postrecording data #B is managed by a postrecording B file, and the non-allocated area is managed by a dummy file.

<Processing in Initial Recording>

The processing in the initial recording in Embodiment 2 is not described here, because the processing is identical with that in Embodiment 1.

<Processing in Recording Postrecording Data>

The following will describe the processing at the time of recording the postrecording data in Embodiment 2. First, QuickTime management information of the user program to which postrecording data is added is read out and stored in the RAM 102. Also, an original program is specified and QuickTime management information of the original program is read out and stored in the RAM 102. Furthermore, file system management information is read out and stored in the RAM 102. The descriptions on how to specify the position of PRU and the determination of the postrecording data recording area are omitted here, because these steps are identical with those in Embodiment 1.

Subsequently, the postrecording data is recorded onto a PRU area on the disc, a file for postrecording is newly generated, and the file system management information is updated. On this occasion, the size of a dummy file composed of non-allocated areas is reduced in line with the size of the newly-generated postrecording data, and the file system management information is updated.

Subsequently, a track for the postrecording data is newly generated in regard of the QuickTime management information of the original program, a sample table of the section specified by the user is generated, and the ref_counter field is set at '1'. Also, to the data reference atom, the postrecording file name that has been generated is set.

Then the chunk offset and size of the sample table of the non-allocated tracks in the original program are updated in such a manner as to correspond to the remaining area of PRU after the recording of the postrecording data.

Then, the sample table of the postrecording track of the original program having been generated is copied to the management information on the user program side.

Finally, the QuickTime management information and file system management information of the original program and user program, those pieces of information being on the RAM 102, are recorded onto the optical disc 106.

The same processing is performed when another type of postrecording data is added. In other words, the number of files to be generated is identical with the number of types of postrecording data.

<Processing in Generation of User Program>

In Embodiment 2, to specify a track of postrecording data to which the user program refers in the original program including more than one piece of postrecording data, a track referring to the file name identical with the file name in Data reference atom of the postrecording track of the user program is searched in the original program. The original program is specified in the audio/video file to which the user program refers. Apart from this, the processing in the generation of the user program in Embodiment 2 is identical with that of Embodiment 1.

<Processing in Deletion of User Program>

In Embodiment 2, to specify which track of the original program manages the postrecording data of the user program to be deleted, the reference file name of the data reference atom is used as in the case of the aforesaid processing in the generation of the user program.

If the ref_counter is changed to 0 as a result of the deletion of the user program, the postrecording data is deleted from the PRU area, and the freed area is changed to the non-allocated area. In addition to the rewriting of the QuickTime management information, the file of the postrecording data is deleted, the size of the dummy file composed of non-allocated areas is increased in line with the size of the deleted file, and the file system management information is updated. Except this, the processing is identical with that in Embodiment 1.

As described above, the size and address of the postrecording file are always constant in Embodiment 1. On this account, the deletion of the postrecording data can be performed only by rewriting the management information, so that the rewriting of the file system is not required. However, to specify the postrecording data, it is necessary to search specific data in the postrecording file, in reference to the chunk offset of the sample.

On the other hand, in Embodiment 2, since the respective pieces of postrecording data are different files, the piece of postrecording data can be specified at once in reference to the reference file name of the data reference atom. It is therefore possible to specify data easily and speedily. However, this requires the operation of the file system in addition to the operation of the management information.

<Variant Example of Embodiment 2>

Figure 26:
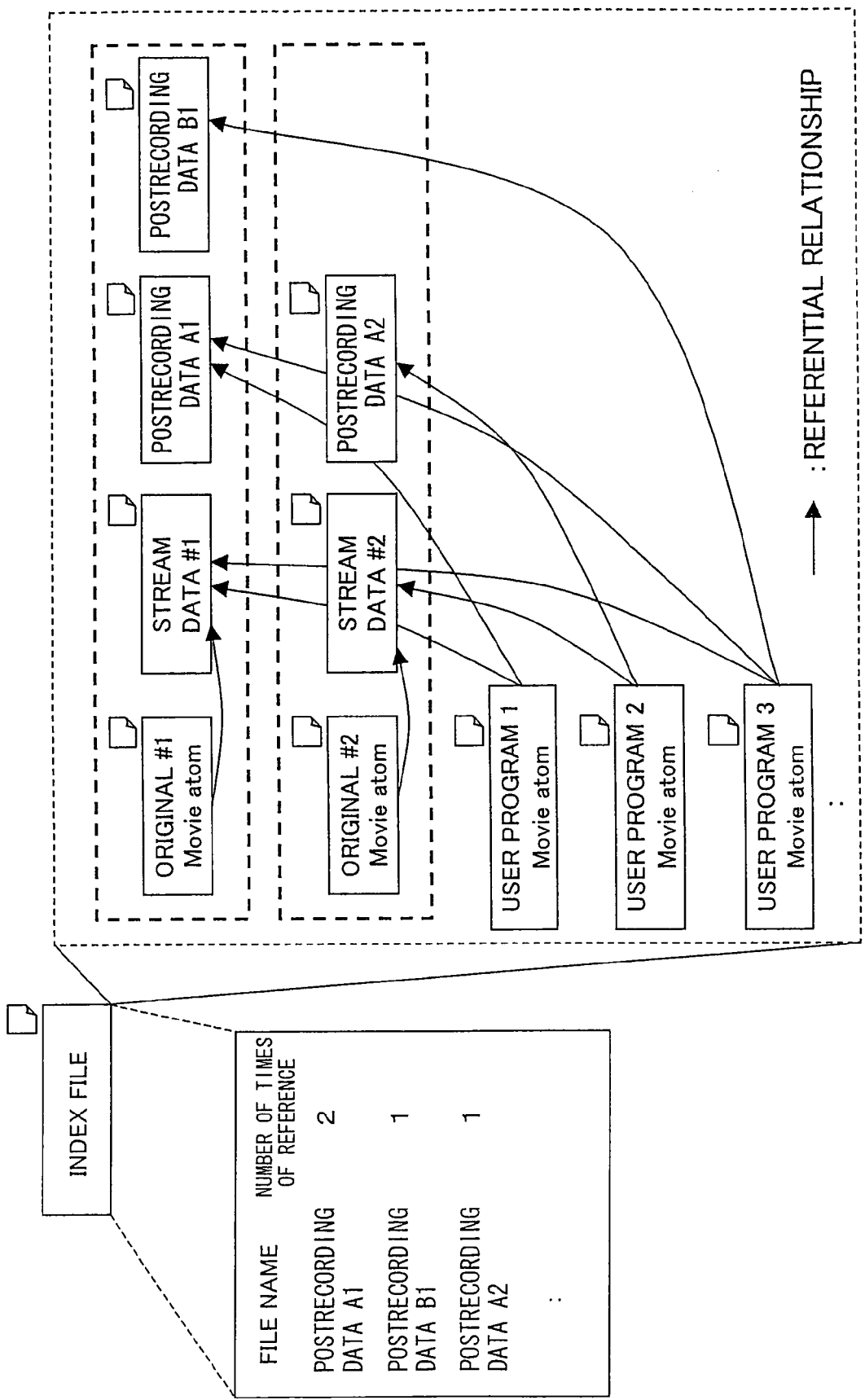
FIG. 26 shows the relationship between (i) in what manner the user programs refer to data and (ii) an index file, in Embodiment 2 of the present invention.
Figure 27:
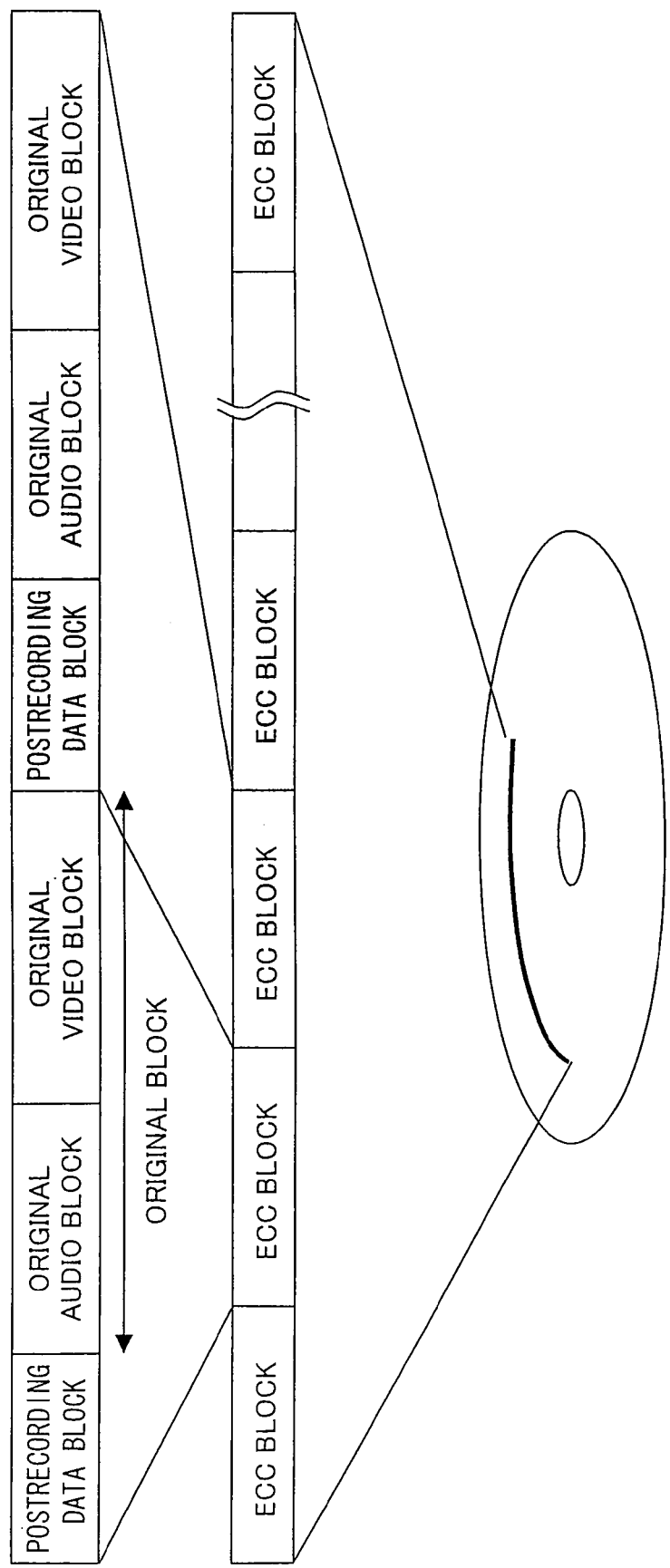
FIG. 27 shows in what way the recording on a disc is performed according to the conventional art.

Embodiment 2 is arranged such that, in the management information of the original program, tracks are provided for the respective types of postrecording data, so that the number of time of reference is managed. Alternatively, the management may be performed in an index file which is a management information file. The number of the index file is one on the disc. In this case, as shown in FIG. 26, the management is performed in such a manner that the information such as a file name, which is used for specifying the postrecording data file, is associated with the information indicating how many times the reference is made.

The recording medium used in Embodiments 1 and 2 is an optical disc. However, the recording medium to which the present invention is applicable is not limited to the optical disc. The recording medium may be, for instance, a random-access recording medium, such as a hard disk.

As described above, the data recording method of the present invention for recording, onto a recording medium, AV data and postrecording data in synchronization with the AV data, is characterized in that, on the recording medium, a plurality of user programs using an identical scene in the AV data being producible, and the postrecording data being referable from a plurality of user programs, the data recording method comprising the step of recording, onto the recording medium, management information that manages a relationship between a user program and postrecording data.

According to the arrangement above, to record AV data and postrecording data in synchronization with the AV data onto a recording medium, a plurality of user programs using an identical scene in the AV data can be produced on the recording medium, and the postrecording data can be referred to from a plurality of user programs, on the recording medium.

For example, in a case where a user program is deleted and postrecording data referred to from the user program to be deleted is also deleted, it is necessary to confirm that the postrecording data which is the target of the deletion is referred to only from the user program to be deleted. According to the arrangement above, it is possible to easily perform the confirmation above in reference to the management information.

According to the above-described data recording method, the following arrangement may be adopted: the postrecording data is a partial area in an area including a postrecording data group which is referred to from more than one type of user programs, the area including the postrecording data group being recorded as one postrecording file, and for each piece of postrecording data, the management information is recorded in a management information file whose quantity is one in each original program.

In addition, according to the above-described data recording method, the following arrangement may be adopted: the postrecording data is recorded as a postrecording file, for each postrecording data group being referred to from one user program, and the management information is recorded for each postrecording file and in a management information file whose quantity is one for a plurality of original programs.

According to the arrangements above, the management can be carried out in such a manner that the size and address of the postrecording file stays always constant, and the deletion of the postrecording data can be carried out only by rewriting the management information. It is therefore unnecessary to rewrite the file system.

In addition, according to the above-described data recording method, the following arrangement may be adopted: the postrecording data is recorded as a postrecording file, for each postrecording data group being referred to from one user program, and the management information is recorded for each postrecording file and in a management information file whose quantity is one for an original program.

According to the arrangement above, since pieces of postrecording data correspond to respective postrecording files, it is possible to swiftly specify postrecording data in reference to the reference file name of each postrecording file, and hence the search in the offset or the like of the data is unnecessary. This makes it possible to specify data easily and speedily.

In addition, according to the above-described data recording method, the following arrangement may be adopted: the management information includes information of how many times the postrecording data is referred to from a plurality of user programs.

According to this arrangement, for example, in a case where a user program is deleted, a number of times of reference that indicates how many times the postrecording data referred to from the user program above is referred to from another user program is decreased by 1. It is therefore possible to easily confirm that the postrecording data whose number of times of reference is 0 on account of the process of decreasing the number of times is referred to only from the user program to be deleted.

In addition, according to the above-described data recording method, the following arrangement may be adopted: the management information includes a name of a user program referring to the postrecording data.

According to the arrangement above, it is possible to carry out the following: in a case where a user program is deleted and also postrecording data referred to from the user program to be deleted is deleted, it is possible to present, to the user, not only whether or not the postrecording data is referred to from another user program file but also which file refers to the postrecording data.

In addition, according to the above-described data recording method, the following arrangement may be adopted: the management information includes information of in what range of the postrecording data a user program refers to.

According to the arrangement above, on account of the information of the reference range indicating which part of the postrecording data is referred to from user programs, it is possible to delete an unnecessary part of the postrecording data, even if the postrecording data is referred to from a plurality of user programs. This makes it possible to effectively utilize the recording areas of the recording medium.

INDUSTRIAL APPLICABILITY

In a data recording method and data recording apparatus that record/playback video data and/or audio data onto/from a random-access recording medium such as a hard disk and optical disc, it becomes easy to determine, at the time of deleting a user program, whether or not postrecording data which is referred to from the user program can be deleted.

The invention claimed is:

1. A data recording apparatus for recording, onto a recording medium, AV data and postrecording data in synchronization with the AV data,
   on the recording medium, a plurality of user programs using an identical scene in the AV data being producible, and the postrecording data being referable from the plurality of user programs, and
   onto the recording medium, management information that manages a relationship between at least one of the user programs and the postrecording data being recorded,
   wherein, the postrecording data is a partial area in an area including a postrecording data group which is referred to from more than one type of the user programs, the area including the postrecording data group being recorded as one postrecording file, and
   for each piece of the postrecording data, the management information is recorded in a management information file, and an original program referred to from more than one type of the user programs includes only one management information file.

2. The data recording apparatus as defined in claim 1, wherein, the management information includes information of how many times the postrecording data is referred to from the plurality of user programs.

3. The data recording apparatus as defined in claim 1, wherein, the management information includes a name of the one of the user programs referring to the postrecording data.

4. The data recording apparatus as defined in claim 1, wherein, the management information includes information of in what range of the postrecording data the one of the user programs refers to.

5. A data recording method for recording, onto a recording medium of a data recording apparatus, AV data and postrecording data in synchronization with the AV data,
   on the recording medium, a plurality of user programs using an identical scene in the AV data being producible, and the postrecording data being referable from the plurality of user programs, and
   the data recording method comprising the step of recording, onto the recording medium, management information that manages a relationship between at least one of the user programs and the postrecording data, wherein, the postrecording data is a partial area in an area including a postrecording data group which is referred to from more than one type of the user programs, the area including the postrecording data group being recorded as one postrecording file, and for each piece of the postrecording data, the management information is recorded in a management information file, and an original program referred to from more than one type of the user programs includes only one management information file.

6. A non-transitory data recording medium on which AV data and postrecording data in synchronization with the AV data are recorded, a plurality of user programs, which are produced using an identical scene of the AV data recorded on the recording medium, being recorded in such a manner as to be capable of referring to the postrecording data, and management information, which manages how at least one of the user programs and the postrecording data refer to one another, being recorded, wherein, the postrecording data is a partial area in an area including a postrecording data group which is referred to from more than one type of the user programs, the area including the postrecording data group being recorded as one postrecording file, and for each piece of the postrecording data, the management information is recorded in a management information file, and an original program referred to from more than one type of the user programs includes only one management information file.

\* \* \* \* \*